United States Patent Office 3,794,523
Patented Feb. 26, 1974

---

3,794,523
SCALE REMOVAL
James L. Thompson, Tulsa, Okla., assignor to The Dow Chemical Company, Midland, Mich.
No Drawing. Filed July 8, 1971, Ser. No. 160,882
Int. Cl. B08b *9/08;* C23g *1/02*
U.S. Cl. 134—3
6 Claims

ABSTRACT OF THE DISCLOSURE

An aromatic solvent in aqueous acid solution emulsion is provided which is useful for treating materials which are normally solubilized by said acid but which are occluded, e.g. coated, with an organic deposit.

BACKGROUND OF THE INVENTION

It is often desired to solubilize various materials with an acid solution. For example, various acid solutions are employed to acidize subterranean formations to increase the permeability thereof. Also various acids are employed to remove various inorganic scale deposits, e.g. calcium carbonate, iron oxides, iron sulfides and the like from pipe lines, casings in boreholes, subterranean formations, tubing, processing equipment and the like.

In many instances the material to be treated with the acid has become occluded, e.g. coated or mixed, with an organic deposit which cannot be readily removed by the acid solution. For example, in oil and gas production formations, and petroleum processing equipment, the formation face and the inorganic scales deposited on the various surfaces become coated with various organic deposits such as oils, asphaltenes, paraffins, tars, greases and the like. To effectively treat the acid soluble material, it is necessary to remove the organic films, coatings, etc. One method employed is to alternatively treat the surface coated with an organic material with an aromatic solvent for said organic deposit and then a treatment with acid to remove the scales or solubilize the formation. These multistage treatments are costly, time consuming and sometimes ineffective. Also, in many cases, several solvent and acid treatments are necessary because an organic material and scale, for example, are deposited in alternate layers.

The present invention concerns a composition and method for solubilizing occluded or commingled organic and acid soluble materials in a one-stage treatment.

SUMMARY OF THE INVENTION

The composition of the present invention comprises a stable aromatic solvent-in-aqueous acid emulsion. The emulsion is prepared by employing an emulsifier comprising an effective amount of (A) a nonylphenol adduct with seven moles of ethylene oxide, such as sold under the trade name Tergitol NP-27 by Union Carbide and at least one of, (B) a blend of about 95% by weight of a reaction product of oleic acid and 2-aminoethylethanol amine, blended with about five percent of an ethylene oxide adduct of alkylphenol, or (C) octylphenol containing ten moles of ethylene oxide.

Acid soluble materials occluded, e.g. coated, with an organic deposit are treated with the emulsion to simultaneously remove the organic substance and solubilize the acid soluble material.

DETAILED DESCRIPTION OF THE INVENTION

The emulsion composition comprises the following constituents in percent by volume, wherein the aqueous acid comprises the continuous phase having dispersed therein an aromatic solvent:

|  | Percent | Preferred Percent |
|---|---|---|
| Aqueous acid | 50–90 | 70–90 |
| Aromatic solvent | 10–50 | 10–30 | and an effective amount of the above-identified emulsifier containing constituent (A) and at least one of (B) or (C).

Acid solutions which may be employed include those normally employed in oil and gas well matrix acidizing and scale removal treatments. These include, for example, certain inorganic acids and mixtures thereof, e.g. HCl, HF, HF–HCl mixtures, etc.; certain organic acids such as acetic acid, sulfamic acid, formic acid; and certain mixtures of organic and inorganic acids such as, for example, acetic acid and HF, and the like.

The concentration of the acid in the acid solution can vary widely and depends primarily on the type of acid soluble material which is to be treated. Typical acids employed to perform matrix acidizing treatments are 15 percent HCl, 12% HCl—6% HF, 12% HCl—8% HF, 12% HCl—10% HF, 20% HCl—15% HF, 25% HCl—20% HF, 5% HCl, acetic acid, sulfamic acid, and the like.

Various additives commonly employed in acidizing solutions may also be included in the aqueous acid phase. For example, corrosion inhibitors, fluid loss agents, viscosity control agents and the like can be employed. Certain additives, however, may not be compatible with the emulsion and, therefore, should be avoided. The compatibility with the emulsion can be easily ascertained by simple laboratory procedures.

Aromatic solvents which can be employed include, for example, toluene, both crude and refined, benzene, xylene, and the like. The aromatic solvent may be admixed with a hydrocarbon carrier liquid, e.g., diesel oil, kerosene, etc., to improve its liquidity or the like.

The emulsifier is employed in an amount which is effective to provide a stable emulsion. The ratio of the different constituents (A), (B) and (C) can be varied over a wide range. The specific ratio will depend on various factors such as the acid and solvent employed, temperature, desired stability time and the like. By stable emulsion it is meant one where there is substantially no breakout of the aromatic solvent before the emulsion is employed in a treatment. A stable emulsion for purposes of the present invention is considered one in which there is less than 20 percent breakout of the aromatic solvent in 24 hours at an ambient temperature of 75° F. At a temperature of 175° F., a stable emulsion is considered one in which there is less than 20% breakout of the aromatic solvent in two hours.

The emulsion may be prepared in any suitable manner. One effective method comprises first forming an aqueous acid-in-aromatic solvent emulsion and then inverting it to form the aromatic solvent-in-aqueous acid emulsion. Thus, the aromatic solvent containing an effective amount of the emulsifier is agitated and the aqueous acid solution is slowly added thereto. The viscosity of the emulsion will increase to form a semi-solid during the initial addition of the acid. On further addition of the acid, the emulsion will thin out to form a low viscosity fluid.

What is claimed is:

1. A composition comprising:
an emulsion comprising as the outer phase an aqueous acid solution and as the inner phase an aromatic liquid which is a solvent for solid or semi-solid organic materials, and an emulsifier said emulsifier comprising a mixture of an adduct of nonyl phenol with seven moles of ethylene oxide and an adduct of octylphenol containing ten moles of ethylene oxide.

2. The composition of claim 1 wherein the aqueous acid phase comprises from about 50–90 percent by volume of the composition and the aromatic solvent comprises from about 10 to about 50 percent by volume.

3. The composition of claim 1 wherein the aqueous acid phase comprises from about 70–90 percent by volume of the emulsion and the aromatic solvent phase comprises from about 10–30 percent by volume.

4. The composition of claim 1 wherein the aqueous acid is a member selected from the group consisting of hydrochloric, hydrofluoric, acetic, sulfamic and formic acids and mixtures thereof.

5. A method of cleaning a surface which has deposited thereon an occluded mixture of an organic deposit and an inorganic scale which comprises:
contacting the surface and deposit with an emulsion comprising as the outer phase an aqueous acid solution which is a solvent for the inorganic scale and as the inner phase an aromatic solvent for said organic deposit and also containing an effective amount of an adduct of nonylphenol with seven moles of ethylene oxide and an adduct of octylphenol containing ten moles of ethylene oxide to stablize the emulsion against breakout of no more than about 20 percent by volume of the aromatic phase in 24 hours at an ambient temperature of about 75° F. to simultaneously remove both the organic and inorganic deposits.

6. The method as defined in claim 5 wherein the surface to be treated is a subterranean formation penetrated by a borehole.

References Cited

UNITED STATES PATENTS

| | | | |
|---|---|---|---|
| 2,135,909 | 11/1938 | Monson | 252—8.55 B X |
| 2,525,078 | 10/1950 | Pabst | 252—143 |
| 3,330,769 | 7/1967 | Golben et al. | 252—143 X |
| 2,199,712 | 5/1940 | Neilson | 134—40 U X |
| 2,261,700 | 11/1941 | Ryznar | 252—87 |
| 2,524,825 | 10/1950 | Pabst | 252—143 |
| 2,050,931 | 8/1936 | De Groote | 252—8.55 B |
| 2,204,224 | 6/1940 | Limerick | 252—8.55 B |
| 2,886,477 | 5/1959 | Smith | 252—143 X |

FOREIGN PATENTS

| | | | |
|---|---|---|---|
| 778,902 | 7/1957 | Great Britain | 252—143 |

BARRY S. RICHMAN, Primary Examiner

U.S. Cl. X.R.

134—22 R, 22 C, 40, 41; 252—8.55 B, 8.55 C; 85, 87, 143, 170, 171